(12) United States Patent
Ramesh Ahuja et al.

(10) Patent No.: US 11,148,582 B2
(45) Date of Patent: Oct. 19, 2021

(54) AUTOMOBILE HEADLIGHT ASSEMBLY

(71) Applicant: Varroc Engineering Limited, Pune (IN)

(72) Inventors: Lalit Ramesh Ahuja, Pune (IN); Ketan Shridhar Talekar, Pune (IN); Aniket Vishwas Takle, Pune (IN)

(73) Assignee: VARROC ENGINEERING LIMITED, Pune (IN)

( * ) Notice: Subject to any disclaimer, the term of this patent is extended or adjusted under 35 U.S.C. 154(b) by 0 days.

(21) Appl. No.: 16/966,875

(22) PCT Filed: Feb. 4, 2019

(86) PCT No.: PCT/IN2019/050080
§ 371 (c)(1),
(2) Date: Jul. 31, 2020

(87) PCT Pub. No.: WO2019/150396
PCT Pub. Date: Aug. 8, 2019

(65) Prior Publication Data
US 2021/0039548 A1 Feb. 11, 2021

(30) Foreign Application Priority Data
Feb. 2, 2018 (IN) .............................. 201821004043

(51) Int. Cl.
*B60Q 1/115* (2006.01)
*B60Q 1/12* (2006.01)
*B60Q 1/18* (2006.01)

(52) U.S. Cl.
CPC .............. *B60Q 1/115* (2013.01); *B60Q 1/122* (2013.01); *B60Q 1/18* (2013.01); *B60Q 2300/122* (2013.01); *B60Q 2300/13* (2013.01)

(58) Field of Classification Search
None
See application file for complete search history.

(56) References Cited

U.S. PATENT DOCUMENTS 6,861,809 B2    3/2005 Stam
6,908,207 B2    6/2005 Jeannot
(Continued)

FOREIGN PATENT DOCUMENTS

CN    102009614 A1    4/2011
DE    102005017933 A1    10/2006
WO    2015038348    3/2015

OTHER PUBLICATIONS

International Search Report for PCT/IN2019/050080 prepared by the Indian Patent Office and dated Mar. 26, 2019.
(Continued)

*Primary Examiner* — Ashok Patel
(74) *Attorney, Agent, or Firm* — Shumaker, Loop & Kendrick, LLP

(57) ABSTRACT

A headlight assembly for an automobile illuminates a path of the automobile while executing a turn. The assembly includes at least one primary light source, a means of determining an orientation of the automobile, the means being configured to generate a first signal when the orientation is varied, a means of determining an orientation of a steering device of the automobile, the means being configured to generate a second signal when the orientation of the steering device is varied, and a control unit configured to receive and condition the first and the second signal to produce a conditioned signal; and at least two secondary light sources, wherein at least one of the at least two secondary light sources is actuated by the conditioned signal transmitted from the control unit. The invention also describes a method for illuminating a path of the automobile while executing a turn.

14 Claims, 6 Drawing Sheets

"On" Condition 512

"Off" Condition 514

(56) References Cited

U.S. PATENT DOCUMENTS

| | | | |
|---|---|---|---|
| 7,241,034 B2 | 7/2007 | Smith et al. | |
| 8,987,991 B2 | 3/2015 | Ikeda et al. | |
| 10,392,066 B2* | 8/2019 | Iwamoto | B60Q 1/12 |
| 2009/0016073 A1* | 1/2009 | Higgins-Luthman | B60Q 1/245 |
| | | | 362/465 |
| 2013/0148369 A1* | 6/2013 | Haest | B60Q 1/076 |
| | | | 362/475 |
| 2015/0028741 A1 | 1/2015 | Schmidt et al. | |
| 2015/0081168 A1 | 3/2015 | McWithey et al. | |
| 2018/0297509 A1* | 10/2018 | McWithey | B62J 6/02 |

OTHER PUBLICATIONS

Written Opinion for PCT/IN2019/050080 prepared by the Indian Patent Office and dated Mar. 26, 2019.
International Search Report for PCT/IN2019/050074 prepared by the Indian Patent Office and dated Apr. 15, 2019.
Written Opinion for PCT/IN2019/050074 prepared by the Indian Patent Office and dated Apr. 15, 2019.

* cited by examiner

AUTOMOBILE HEADLIGHT ASSEMBLY

CROSS-REFERENCE TO RELATED APPLICATIONS

This application claims priority to patent application PCT/IN2019/050080, which is pending and was filed on 4 Feb. 2019 and which is hereby incorporated by reference in its entirety for all purposes. Patent application PCT/IN2019/050080 claims priority to Indian provisional patent application no. IN201821004043 filed on 2 Feb. 2018, which is incorporated herein in its entirety for all purposes.

BACKGROUND OF THE INVENTION

1. Field of the Invention

The present invention relates to headlights for automobiles. More specifically, the invention relates to headlights for automobiles that allow improved illumination while turning.

2. Discussion of the Related Art

The headlight assembly of an automobile serves to illuminate the path directly in front of the automobile. However, the headlight is generally ineffective in illuminating the path of an automobile, as the automobile executes a turn. This problem is more serious for two-wheeled automobiles, where the light from the headlight is directed away from the direction of the turn, leading to poor visibility for the rider of the automobile while executing a turn. This is even more a problem while turning at high speeds, wherein a rider could execute a turn by merely tilting the automobile, rather than turning the steering.

Headlight assemblies that attempt to mitigate this problem are known in the prior art. US patent U.S. Pat. No. 8,987,991 describes a sub-headlight and sub-headlight unit that includes a light source and a detection unit that detects a lean angle of a vehicle and cause the sub-headlight unit to emit a flash or beam of light for a certain unit of time. U.S. Pat. No. 6,908,207 describes an apparatus for illuminating the path in front of an automobile while turning. The apparatus is designed to rotate the headlight of the automobile in the direction of the turn. U.S. Pat. No. 7,241,034 describes a directional control system for a headlight assembly for an automobile. The system incorporates a sensor that generates a signal depending on the condition of the vehicle, such as steering angle, pitch, ride height, etc., and causes a movement in the position of the headlight, in order to adjust for the change in the condition of the vehicle. This system facilitates the driver while turning the automobile.

SUMMARY OF THE INVENTION

One embodiment of the present invention describes a headlight assembly for an automobile configured to illuminate a path of the automobile while executing a turn. The assembly includes at least one primary light source, a means of determining an orientation of the automobile in space, the means of determining the orientation being configured to generate a first signal when the orientation of the automobile is varied, a means of determining an orientation of a steering device of the automobile, the means of determining the orientation of the steering device being configured to generate a second signal when the position of the steering device is varied, and a control unit configured to receive and condition the first signal and the second signal to produce a conditioned signal; and at least two secondary light source positioned on either side of the primary light source, wherein at least one of the at least two secondary light source is actuated by the conditioned signal transmitted from the control unit.

Another embodiment of the present invention is a method for illuminating a path while executing a turn on an automobile. The automobile includes a headlight assembly. The headlight assembly includes at least one primary light source, a means of determining an orientation of the automobile in space, the means of determining the orientation being configured to generate a first signal when the orientation of the automobile is varied, a means of determining a position of a steering device of the automobile, the means of determining the position being configured to generate a second signal when the position of the steering device is varied, a control unit configured to receive and condition the first and the second signal to produce a conditioned signal; and at least two secondary light source positioned on either side of the primary light source, wherein at least one of the at least two secondary light source is actuated by the conditioned signal transmitted from the control unit. The method includes the steps of: receiving, at the control unit a first signal from the means of determining the orientation of the automobile, the signal being generated when the orientation of the automobile is varied, conditioning the signal at the control unit to produce a conditioned signal, transmitting the conditioned signal from the control unit to the at least two secondary light source; and actuating the at least two secondary light source to illuminate the path while executing a turn on the automobile.

DETAILED DESCRIPTION OF THE INVENTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

In the specification and the claims which follow, reference will be made to a number of terms which shall be defined to have the following meanings:

The singular forms "a", "an" and "the" include plural referents unless the context clearly dictates otherwise. "Optional" or "optionally" means that the subsequently described event or circumstance may or may not occur, and that the description includes instances where the event occurs and instances where it does not. "Substantially" means a range of values that is known in the art to refer to a range of values that are close to, but not necessarily equal to a certain value.

As used herein the term "automobile" is defined as a system for transporting people or cargo by road. The term is intended to include, but not be limited to, motorized and non-motorized transportation systems, and is also intended to include automobiles with two, three, or more wheels. Non-limiting examples of such automobiles may include bicycles, motor-cycles, scooters, and the like.

One embodiment of the present invention describes a headlight assembly for an automobile configured to illuminate a path of the automobile while executing a turn. The assembly includes at least one primary light source, a means of determining an orientation of the automobile in space, the means of determining the orientation being configured to generate a first signal when the orientation of the automobile is varied, a means of determining an orientation of a steering device of the automobile, the means of determining the orientation of the steering device being configured to generate a second signal when the position of the steering device is varied, and a control unit configured to receive and condition the first signal and the second signal to produce a conditioned signal; and at least two secondary light source positioned on either side of the primary light source, wherein at least one of the at least two secondary light source is actuated by the conditioned signal transmitted from the control unit.

Figure 1:
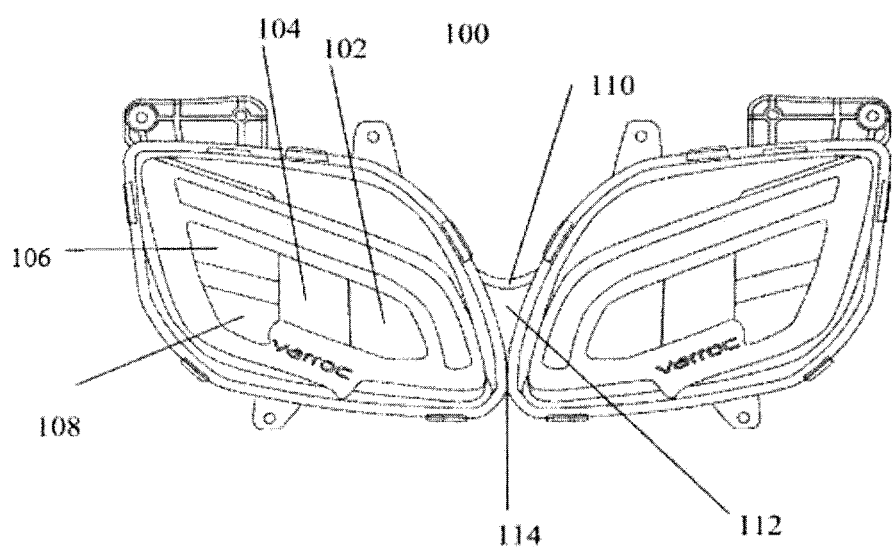
FIG. 1 is a representation of a headlight assembly for an automobile according to an embodiment of the invention.

As depicted in FIG. 1 according to an embodiment of the present invention, the headlight assembly 100 includes two primary light sources 102 and 104. The headlight assembly 100 also includes two secondary light sources 106 and 108. The two secondary light sources 106 and 108 can be disposed towards the outer side of the primary light sources 102 and 104, with reference to the center of the headlight assembly 100. The headlight assembly 100 also includes a means of determining the orientation 110 of the automobile. The means of determining the orientation 110 of the automobile is configured to generate a first signal when the orientation of the automobile is varied. The orientation of the automobile may include the tilt of the automobile, steering angle of the automobile, and the like. The headlight assembly 100 includes a control unit 114. The control unit 114 is configured to receive a first signal generated by the means of determining the orientation 110 of the automobile, and a second signal generated by the means of determining the position 112 of a steering device of the automobile. The control unit 114 is configured to condition the first signal and the second signal to produce a conditioned signal. The control unit 114 can further transmit the conditioned signal to the secondary light sources 106, 108 and may be used to actuate the secondary light sources 106, 108.

Figure 2:
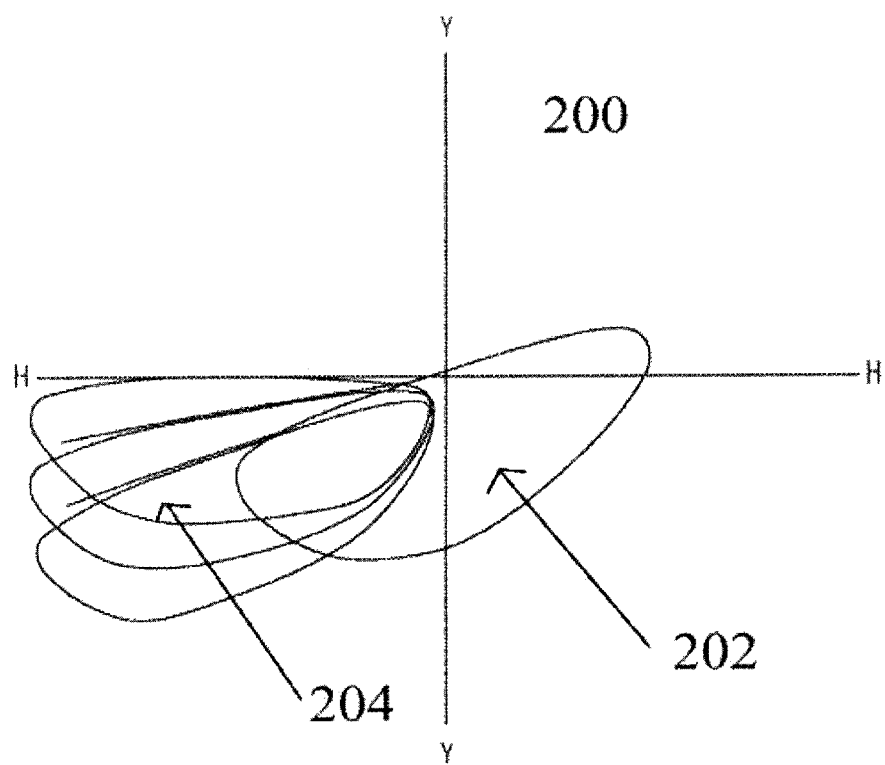
FIG. 2 is a representation of the change in a spread of light of a headlight as a function of the change in a tilt of an automobile according to an embodiment of the invention.

Referring now to FIG. 2, the change in the beam spread 200 due to the actuation of the secondary light sources is shown according to an example embodiment of the present invention. As depicted in FIG. 2, the light beam 202 from the primary light sources serves to illuminate the roads in front of the automobile, while the light beam 204 varies as a function of the tilt angle of the automobile.

In one embodiment of the present invention, the headlight assembly 100 is disposed at the proximal end of the automobile. The proximal end of the automobile refers to the front end of the automobile, ahead of a rider or driver of the automobile, while the distal end would be the back end of automobile, behind the rider or driver of the automobile.

In an embodiment of the present invention, at least one of the at least two secondary light source can be actuated when the orientation of the automobile is varied. In another embodiment of the present invention, at least one of the at least two secondary light source can be actuated when the orientation of the steering device is varied. In yet another embodiment of the present invention, the at least two secondary light source can be actuated when the orientation of the automobile and the orientation of the steering device are varied.

In an embodiment of the present invention, the orientation of the automobile in space can be a tilt angle of the automobile. In another embodiment of the invention, the means of determining the orientation of the automobile in space can be a gyroscope.

In an embodiment of the present invention, the orientation of the automobile may refer to the tilt of the automobile, steering angle of the automobile, and the like. In another embodiment of the present invention, the orientation of the automobile refers to the tilt angle of the automobile.

In a specific embodiment of the present invention, the means of determining an orientation of the automobile in space can be configured to generate a first signal when the tilt angle of the automobile is greater than about 5 degrees with respect to a vertical axis of the automobile. Thus, the at least two secondary light sources 106, 108 are actuated when the tilt angle of the automobile exceeds at least about 5 degrees.

In a specific embodiment of the present invention, the at least two secondary light sources 106, 108 are actuated when the rider or driver of the automobile tilts the automobile in order to execute a turn. Thus, the at least two secondary light sources 106 and 108 serve to provide additional illumination as the rider or driver as the rider or driver executes a turn on the automobile.

In an embodiment of the present invention, the at least two secondary light sources 106, 108 may be configured to produce additional illumination as the tilt angle of the automobile increases at an angle of at least beyond 5 degrees. For example, the at least two secondary light sources 106 and 108 may be configured to provide additional illumination for every 5 degree multiple of the tilt angle of the automobile.

In an embodiment of the present invention, the control unit is a microprocessor. In another embodiment of the present invention, the control unit is a light emitting diode driver module.

Non-limiting examples of the primary light sources 102, 104 and the at least two secondary light sources 106, 108 may be incandescent bulbs, fluorescent bulbs, light emitting diodes, and the like. In a preferred embodiment of the present invention, the primary light sources 102, 104 and the at least two secondary light sources 106, 108 are light emitting diodes.

Another embodiment of the present invention is a method for illuminating a path while executing a turn on an automobile. The automobile includes a headlight assembly. The headlight assembly includes at least one primary light source, a means of determining an orientation of the automobile in space, the means of determining the orientation being configured to generate a first signal when the orientation of the automobile is varied, a means of determining a position of a steering device of the automobile, the means of determining the position being configured to generate a second signal when the position of the steering device is varied, a control unit configured to receive and condition the first signal and the second signal to produce a conditioned signal; and at least two secondary light source positioned on either side of the primary light source. At least one of the at least two secondary light source is actuated by the conditioned signal transmitted from the control unit. The method includes the steps of: receiving, at the control unit the first signal from the means of determining the orientation of the automobile and the second signal from the means of determining the position of the automobile, the first signal being generated when the orientation of the automobile is varied and the second signal being generated when the orientation of the steering device is varied, conditioning the first signal and the second signal at the control unit to produce a conditioned signal, transmitting the conditioned signal from the control unit to at least one of the at least two secondary light source; and actuating at least one of the at least two secondary light source to illuminate the path while executing a turn on the automobile.

In an embodiment of the present invention, at least one of the at least two secondary light source 106 and 108 can be actuated when the orientation of the automobile is varied. In a specific embodiment of the present invention, secondary light source 106 can be actuated when the orientation of the automobile is varied.

In an embodiment of the present invention, at least one of the at least two secondary light source 106 and 108 can be actuated when the position of the steering device is varied. In a specific embodiment of the present invention, at least one of the at least two secondary light source 108 is actuated when the orientation of the steering device of the automobile is varied.

In an embodiment of the present invention, the at least two secondary light source 106 and 108 can be actuated simultaneously, when the orientation of the automobile and the position of the steering device are varied. In a specific embodiment of the present invention, the secondary light sources 106 and 108 can be actuated when the orientation of the automobile and the position of the steering device are varied.

Figure 3:
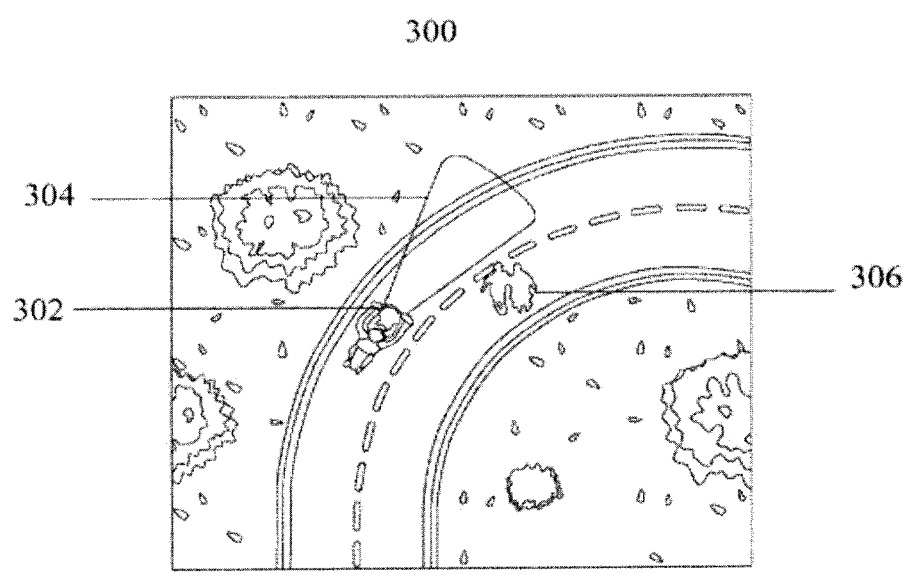
FIG. 3 is a representation of a beam pattern of a prior art headlight assembly of an automobile while the automobile executes a turn.

Referring now to FIG. 3, the beam pattern 300 of a headlight assembly 302 of a prior art automobile headlight is shown. As can be seen from the FIG. 3 the beam does not illuminate areas directly in front of the automobile while executing a turn. Furthermore, as illustrated in FIG. 3, a beam pattern 304 of the embodiment of the present invention serves to illuminate the path in front of the headlight assembly 302, however, the beam pattern 304 fails to illuminate an object 306 in front of the headlight assembly 302.

Figure 4:
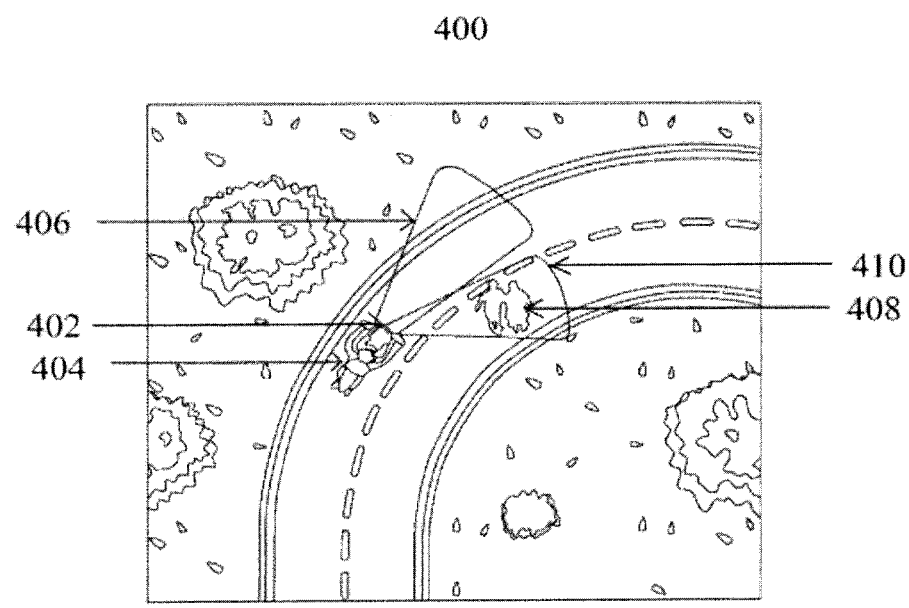
FIG. 4 is a representation of a beam pattern of the headlight assembly of an automobile, while the automobile executes a turn according to an embodiment of the invention.

Referring now to FIG. 4, the beam pattern 400 of an embodiment of the headlight assembly 402 of the present invention is shown. It can be seen that the beam pattern 406 of the embodiment of the present invention serves to illuminate the path in front of the path of the automobile 404 while executing a turn, enabling the rider or the driver to see an object 408 in the path of the automobile 404. The at least two secondary light source can be actuated while executing the turn, provides better illumination 410 of the path in front of the turning automobile 404, as compared to the prior art headlight assemblies shown in FIG. 3.

Figure 5:
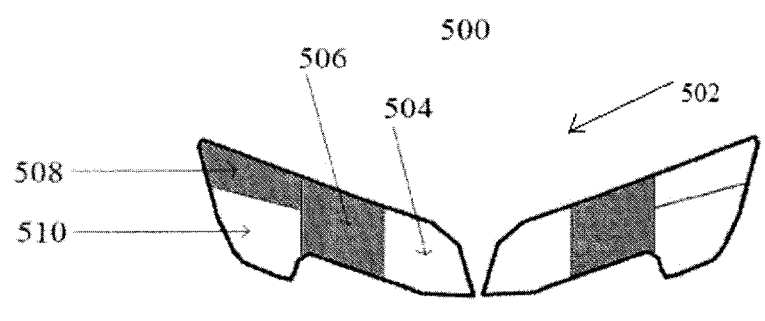
FIG. 5 is a representation of a headlight assembly of an automobile, depicting the operation of the headlight assembly while the automobile executes a turn, according to an embodiment of the invention.

Referring now to FIG. 5, the headlight assembly 500 of an automobile according to an embodiment of the present invention, depicting the operation of the headlight assembly 500 while the automobile (Not Shown) executes a turn, is depicted here. Further, the headlamp assembly 500 comprises primary light sources 504 and 506. The darkened regions 512 depict the at least two secondary light sources 508, 510 that have been actuated, while the lighter regions 514 of the headlight depict the at least two secondary light sources 508, 510 have not been actuated. It is seen in the FIG. 5, that when the automobile (Not shown) executes a turn, at least one of the at least two secondary light source 508, 510 is actuated.

Figure 6:
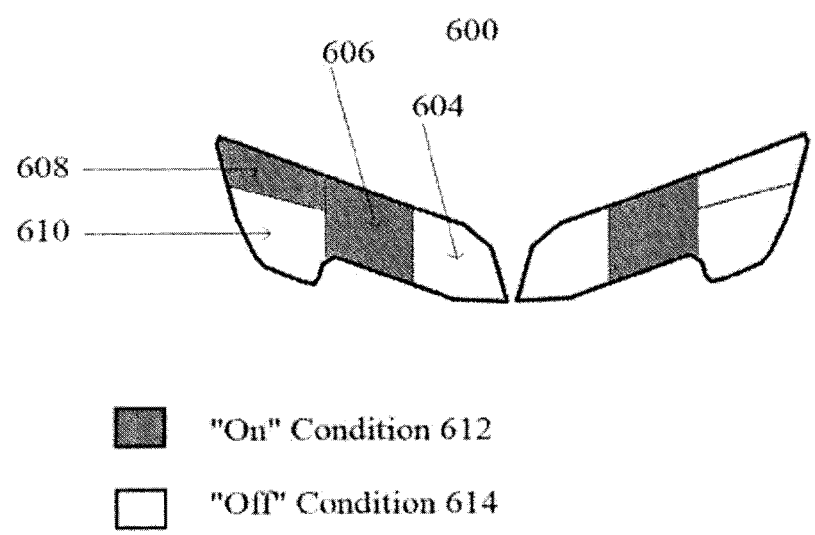
FIG. 6 is a representation of a headlight assembly of an automobile, depicting the operation of the headlight assembly while the automobile tilts according to an embodiment of the invention.

Referring now to FIG. 6, the headlight assembly 600 of an automobile according to an embodiment of the present invention, depicting the operation of the headlight assembly 600 while the automobile executes a turn while tilting, is depicted here. The darkened regions 612 depict the at least two secondary light sources 608, 610 that have been actuated, while the lighter regions 614 of the headlight depict the at least two secondary light sources 608, 610 that have not been actuated. It is seen in the FIG. 6, that when the automobile 602 executes a turn while tilting, the at least two secondary light sources 608 and 610 are actuated.

What is claimed is:

1. A headlight assembly for an automobile configured to illuminate a path of the automobile while executing a turn, comprising, at least one primary light source;
   a means for determining an orientation of the automobile in space, the means for determining the orientation being configured to generate a first signal when the orientation of the automobile is varied,
   a means for determining an orientation of a steering assembly of the automobile, the means for determining the orientation of the steering device being configured to generate a second signal when the orientation of the steering device is varied;
   a control unit configured to receive and condition the first signal and the second signal to produce a conditioned signal; and
   at least two secondary light sources positioned on either side of the primary light source, wherein at least one of the at least two secondary light sources are actuated by the conditioned signal transmitted from the control unit.

2. The headlight assembly of claim 1, wherein at least one of the at least two secondary sources are actuated when the orientation of the automobile is varied.

3. The headlight assembly of claim 1, wherein at least one of the at least two secondary light sources are actuated when the orientation of the steering device is varied.

4. The headlight assembly of claim 1, wherein the at least two secondary light sources are actuated when the orientation of the automobile and the orientation of the steering device are varied.

5. The headlight assembly of claim 1, wherein the orientation of the automobile is a tilt angle of the automobile.

6. The headlight assembly of claim 1, wherein the means for determining the orientation of the automobile in space is a gyroscope.

7. The headlight assembly of claim 1, wherein the at least one primary light source is an incandescent bulb, a fluorescent bulb, or a light emitting diode.

8. The headlight assembly of claim 1, wherein the at least two secondary light sources are an incandescent bulb, a fluorescent bulb, or a light emitting diode.

9. The headlight assembly of claim 1, wherein the control unit is a microprocessor or a light emitting diode driver module.

10. A method for illuminating a path while executing a turn on an automobile, comprising a headlight assembly, comprising at least one primary light source, a means for determining an orientation of the automobile in space, the means for determining the orientation being configured to generate a first signal when the orientation of the automobile is varied, a means for determining an orientation of a steering device of the automobile, the means for determining the position being configured to generate a second signal when the orientation of the steering device is varied, a control unit configured to receive and condition the first and the second signal to produce a conditioned signal; and at least two secondary light sources positioned on either side of the primary light source, wherein at least one of the at least two secondary light sources are actuated by the conditioned signal transmitted from the control unit, the method comprising the steps of:

receiving, at the control unit the first signal from the means for determining the orientation of the automobile and the second signal from the means for determining the orientation of the steering device, the first signal being generated when the orientation of the automobile is varied and the second signal being generated when the orientation of the steering device is varied;

conditioning the first signal and the second signal at the control unit to produce a conditioned signal;

transmitting the conditioned signal from the control unit to the at least two secondary light sources; and actuating at least one of the at least two secondary light source sources to illuminate the path while executing a turn on the automobile.

11. The method of claim 10, wherein at least one of the at least two secondary light sources are actuated when the orientation of the automobile is varied.

12. The method of claim 10, wherein at least one of the at least two secondary light sources are actuated when the orientation of the steering device is varied.

13. The method of claim 10, wherein the at least two secondary light sources are actuated when the orientation of the automobile and the orientation of the steering device are varied.

14. The method of claim 10, wherein the at least two secondary light sources are actuated simultaneously, when the orientation of the automobile and the orientation of the steering device are varied.

* * * * *